United States Patent
Humphrey et al.

(12)

(10) Patent No.: US 11,377,381 B2
(45) Date of Patent: Jul. 5, 2022

(54) SLURRY HANDLING APPARATUS

(71) Applicant: CDEnviro Limited, Cookstown (GB)

(72) Inventors: Alex Humphrey, Cookstown (GB); Darren Eastwood, Cookstown (GB)

(73) Assignee: CDE Global Limited, Cookstown (GB)

( * ) Notice: Subject to any disclaimer, the term of this patent is extended or adjusted under 35 U.S.C. 154(b) by 185 days.

(21) Appl. No.: 16/620,186

(22) PCT Filed: May 22, 2018

(86) PCT No.: PCT/EP2018/063330
§ 371 (c)(1),
(2) Date: Dec. 6, 2019

(87) PCT Pub. No.: WO2018/224298
PCT Pub. Date: Dec. 13, 2018

(65) Prior Publication Data
US 2021/0053072 A1 Feb. 25, 2021

(30) Foreign Application Priority Data

Jun. 6, 2017 (GB) .................................... 1708952
Dec. 14, 2017 (GB) .................................... 1720848

(51) Int. Cl.
*B65G 69/12* (2006.01)
*C02F 11/121* (2019.01)
(Continued)

(52) U.S. Cl.
CPC ............. *C02F 11/121* (2013.01); *B03B 5/06* (2013.01); *B03B 5/34* (2013.01); *B03B 9/061* (2013.01);
(Continued)

(58) Field of Classification Search
CPC .. B03B 5/06; B03B 5/34; B03B 9/061; B07B 2230/01; B65G 67/24; B65G 69/005; B65G 69/12; C02F 11/121
(Continued)

(56) References Cited

U.S. PATENT DOCUMENTS 2,106,027 A * 1/1938 Guest ........................ B03B 5/06
209/458
3,446,349 A * 5/1969 Benzon ................ B01D 29/014
209/17
(Continued)

FOREIGN PATENT DOCUMENTS

CH 432377 1/1996
EP 0034539 8/1981
(Continued)

OTHER PUBLICATIONS

International Search Report of corresponding PCT Application No. PCT/EP2018/063330, dated Sep. 5, 2018.
(Continued)

*Primary Examiner* — Joseph C Rodriguez
(74) *Attorney, Agent, or Firm* — Gardner Linn (57) ABSTRACT

A slurry handling apparatus includes at least one reception hopper includes a base, a rear wall and opposing side walls, and an opening provided in the base. Slurry delivered into the reception hopper from a tanker can pass through the opening in the base, and a respective first dewatering screen having an apertured screening deck is located beneath the at least one reception hopper so that slurry passing through the opening is delivered onto the deck of the respective screen, with undersize material and water passing through the apertures of the deck to be received within a sump, and with oversize material passing over the deck to be discharged from a downstream end of the deck.

27 Claims, 7 Drawing Sheets

(51) Int. Cl.
*B03B 5/06* (2006.01)
*B03B 5/34* (2006.01)
*B03B 9/06* (2006.01)
*B65G 67/24* (2006.01)
*B65G 69/00* (2006.01)
*C02F 11/127* (2019.01)
*C02F 103/10* (2006.01)
*E02F 3/88* (2006.01)

(52) U.S. Cl.
CPC .......... *B65G 67/24* (2013.01); *B65G 69/005* (2013.01); *C02F 11/127* (2013.01); *C02F 2103/10* (2013.01); *E02F 3/88* (2013.01)

(58) Field of Classification Search
USPC ................................................ 209/244–246
See application file for complete search history.

(56) References Cited

U.S. PATENT DOCUMENTS

| | | | | |
|---|---|---|---|---|
| 3,741,532 A | * | 6/1973 | Farnham | E01C 19/1068 366/7 |
| 3,997,434 A | | 12/1976 | Macauley, Jr. | |
| 4,199,441 A | * | 4/1980 | Ross | B03B 5/66 209/44 |
| 4,525,270 A | * | 6/1985 | McCann | B03B 5/26 209/202 |
| 5,339,961 A | * | 8/1994 | Mayhak | B03B 9/06 209/3 |
| 5,833,863 A | | 11/1998 | Richards et al. | |
| 6,544,425 B2 | * | 4/2003 | Miller | F26B 5/005 210/710 |
| 6,837,380 B2 | * | 1/2005 | Stoner | B65G 69/12 209/240 |
| 8,151,993 B2 | * | 4/2012 | Smith | B03B 5/40 209/173 |
| 9,289,701 B2 | * | 3/2016 | Laros | B01D 21/2427 |
| 2009/0078615 A1 | * | 3/2009 | Rainwater | B03B 5/26 209/44 |

FOREIGN PATENT DOCUMENTS

| | | |
|---|---|---|
| EP | 0111014 | 6/1984 |
| EP | 1302420 | 4/2003 |
| FR | 2702390 | 9/1994 |
| GB | 2232616 | 12/1990 |
| GB | 2313072 | 11/1997 |
| GB | 2457068 | 8/2009 |
| JP | H10296714 | 11/1998 |
| KR | 10-2011-0030749 | 3/2011 |
| WO | 01/87489 | 11/2001 |

OTHER PUBLICATIONS

UK Search Report of corresponding Application No. GB1720848.9, dated May 18, 2018.

* cited by examiner

SLURRY HANDLING APPARATUS

CROSS REFERENCE TO RELATED APPLICATIONS

The present application is a § 371 national stage of International Application PCT/EP2018/063330, filed May 22, 2018, which claims priority benefit of U.K. Pat. Application Ser. No. 1708952.5, filed Jun. 6, 2017, and U.K. Pat. Application Ser. No. 1720848.9, filed Dec. 14, 2017, all of which are hereby incorporated herein by reference in their entireties

FIELD OF THE INVENTION

The present invention relates to a slurry handling apparatus for handling slurry from a hydro-evacuation (hydrovac) process.

BACKGROUND OF THE INVENTION

Hydro-excavation is a process for performing ground works wherein high-pressure water jets are used to cut and dig earth and a vacuum system is used to suck up the resulting slurry into a storage tank mounted on a vehicle (referred to herein after as a "hydrovac tanker") for subsequent disposal. The slurry held in the storage tank of such hydrovac tankers must be emptied at a disposal or recycling site, wherein the solid material is separated from the water.

The slurry collected during such hydro-evacuation process typically comprise 50% free water and 50% solids. Typically such slurry is discharged from the storage tank of the hydrovac tanker by hydraulically raising the tank while opening a rear door in the tank. This results in the free liquid being initially discharged in a wave having a very high initial flow rate as the rear door is opened, leaving the bulk of the wet solid material behind, which is subsequently discharged at a much slower rate.

It is desirable to feed a recycling system, wherein the solid waste is separated from the water, directly from the storage tanks of these hydrovac tankers. However, the abovementioned high initial flow rate of the slurry as it is discharged from the storage tank makes this very difficult to achieve. One solution would be to pump the slurry from the storage tank of the tanker to a recycling system at a controlled flow rate. However, the slurry typically contains solid material having a wide range of particle size, typically up to 150 mm in size, which would block and/or damage a pump.

One solution is to discharge the slurry from the tanker into a reception hopper having sufficient volume to cope with the high initial flow rate of water from the tank. However, this would normally require creation of a ramp up which the tanker must drive to bring the tanker into position over such a reception hopper. The construction of such ramps can be costly and, particularly where earthen ramps are used, instability of the ramp can lead to the risk of the tanker tipping over or falling off the ramp.

SUMMARY OF THE INVENTION

According to an aspect of the present invention there is provided a slurry handling apparatus comprising at least one reception hopper comprising a base, a rear wall and opposing side walls, an opening being provided in the base, wherein slurry delivered into the reception hopper from a tanker can pass through the opening in the base, a dewatering screen having an apertured screening deck being located beneath the reception hopper whereby slurry passing through the opening is delivered onto the deck of the screen, undersize material and water passing through the apertures of the deck to be received within a sump located thereneath, oversize material passing over the deck to be discharged from a downstream end of the deck.

Spray bars may be located over the deck of the dewatering screen for washing material on the deck of the screen.

Optionally, the base of the at least one reception hopper is at the same height as an adjacent roadway whereby a tanker may reverse up the roadway to the reception hopper and discharge slurry from a storage tank thereof into the at least one reception hopper.

A front portion of the base of the at least one reception hopper may be configured to receive the rear wheels of the tanker. Raised backstops may be provided for limiting the travel of a tanker over the base of the at least one reception hopper.

Walkways may be provided on either side of the opening in the base of the at least one reception hopper. Optionally, barriers are provided between the walkways and the opening in the base of the at least one reception hopper.

Optionally, a grill or grid is located over the opening in the base of the at least one reception hopper to prevent persons from falling into the opening.

Flow control members may be provided on the rear wall and/or side walls of the at least one reception hopper for arresting the flow of water up the walls when slurry is initially discharged into the reception hopper. In one embodiment the flow control members may comprise inverted V shaped plates and mounted on and extend from the rear wall and/or side walls of the at least one reception hopper.

A pump may be provided for pumping slurry collected therein to a further process. The pump may be adapted to agitate the slurry held within the sump.

One or more access doors may be provided in the base and/or rear wall of the at least one reception hopper openable to provide access to the dewatering screen.

An indicating device may be provided on the at least one reception hopper for indicating to the driver of a tanker the status of the associated dewatering screen. The indicating device may comprise one or more lights.

In one embodiment the slurry handling apparatus may comprise a plurality of reception hoppers mounted in side by side relationship. A respective dewatering screen may be mounted beneath each reception hopper.

In one embodiment the apertures in the deck of the dewatering screen are 6 mm wide, although other sizes are envisaged.

The opening in the base of the at least one reception hopper may be provided with a flow control device to limit the flow rate of water and/or slurry delivered through the opening onto the deck of the dewatering screen. In one embodiment the flow control device may comprise bars or plates located in and/or beneath the opening.

In one embodiment the at least one reception hopper may be adapted to be raised to provide maintenance access to the respective dewatering screen therebeneath.

These and other objects, advantages and features of the invention will become apparent upon review of the following specification in conjunction with the drawings.

BRIEF DESCRIPTION OF THE DRAWINGS

A slurry handling apparatus in accordance with preferred embodiments of the present invention will now be described, by way of example only, with reference to the accompanying drawings, in which:—

DESCRIPTION OF THE PREFERRED EMBODIMENTS

A slurry handing apparatus in accordance with a first embodiment of the present invention, as illustrated in the drawings, comprises two or more side by side reception hoppers 10A,10B for receiving slurry discharged from a hydrovac tanker 2, defining a plurality of side by side reception stations. Each reception hopper comprises a base 12, opposing side walls 14,16 and an inclined rear wall 18, with an open front, an opening 20 being provided in the base 12 for delivering the slurry onto a respective dewatering screen 30A,30B mounted between the respective hoppers 10A,10B.

It is envisaged that a single reception station may be provided with one reception hopper and one tanker discharge position, as well as a multiple reception hopper units with several tanker positions as shown in the drawings.

The apparatus will be set into the ground such that hydrovac tankers 2 can discharge their storage tanks directly into it a respective reception hopper 10A,10B at ground level, with the base 12 of each reception hopper 10A,10B being level with an adjacent roadway 4, avoiding the need for a costly and potentially unstable ramp. Each reception hopper 10A,10B is positioned above a respective vibrating dewatering/grading screen 30A,30B. Slurry discharged into the respective reception hopper 10A,10B from the storage tank of a tanker 2 passes onto a deck 32 of the respective dewatering screen 30A,30B under gravity through the opening 20 in the base 12 of the respective reception hopper 10A,10B.

The open front of each reception hopper 10A,10B provides for access by a tanker 2, while the raised side walls 14,16 and angled rear wall 18 are adapted to retain the wave of water initially discharged from the tanker 2 and funnel the water through the opening 20 onto the respective dewatering screen 30A,30B, along with the solids that come after, without spillage. Each reception hopper 10A,10B is relatively wide and long compared to the opening 20 therein to contain the high volume and large amounts of splash when the liquid is initially discharging from the tanker with a smaller opening 20 in the base thereof being adapted to control the flow rate of water onto the respective dewatering screen 30A,30B. The angle of the rear wall of each reception hopper may be variable to cope with different flow rates of incoming slurry/water.

Tanker wheel supports 22 are provided at a front side of each reception hopper 10A,10B, which allow a tanker 2 to get as far back as possible over the opening 20 in the respective hopper 10A,10B to ensure all drips are contained, raised backstops 24 being provided for engaging the rearmost wheels of the tanker 2 to limit the travel of the tanker 2 into the respective reception hopper 10A,10B.

Each reception hopper 10A,10B has a protection grid 25 over the opening 20 in the base 12 thereof to prevent persons falling into opening 20 by accident. However, the spacing of the bars of the grid is large enough that it will not trap material from the tanker. One or more access panels may be provided in the base 12 and/or rear wall 18 of each reception hopper 10A,10B to allow access to the respective dewatering screen 30A,30B, in particular to allow removal of the dewatering screen's vibrating motor.

Drains and/or submersible pumps may be provided for collecting and removing rain water from each reception hopper and/or the sump of the (or each) dewatering screen.

Each dewatering screen 30A,30B may comprise a modular polyurethane deck 32 having a plurality of apertures formed therein. The deck 32 may be mounted on a support frame comprising spaced apart side walls 34,35 joined by transversely extending bridging members 36. The support frame is mounted on a base frame 38 via resilient mountings (not shown) to allow the support frame to move with respect to the base frame. The support frame may be suspended from the base frame via suitable resilient mounts, such as springs.

A vibration generating device 40 is mounted between the side walls 34,35 of the support frame, extending transverse to the deck 32 of the respective dewatering screen 30A,30B. The vibration generating device 40 may comprise a pair of motor driven eccentrically loaded rotors mounted in or on support pipes mounted between the side plates for rotation about substantially parallel rotational axes extending transverse to the deck or a single eccentrically driven rotor. The rotor or rotors may be adapted to generate a reciprocal or rotary motion to the deck. Rotation of the rotor or rotors causes a rotating out of balance force to be applied to the support frame, imparting a vibratory motion to the deck and to the material carried thereon. Such vibratory motion causes the material placed on the deck 32 to be agitated, allowing water and undersize material to pass through the apertures in the deck 32, while preventing blocking of the apertures in the deck 32, and causing oversize material on the deck 32 to be washed and conveyed towards a downstream end of the deck 32 from which it is discharged.

A rubber skirt or curtain 56 may be mounted over the downstream end of the deck 32 of each dewatering screen 30A,30B having a free lower edge adjacent the deck 32 to retain material on the deck 32 of the respective dewatering screen 30A,30B, particularly during the initial high flow rate during discharge of material from the tanker.

In a preferred embodiment the apertures in the deck 32 of each dewatering screen 30A,30B have a width of 6 mm, although other sizes may be envisaged depending upon the application. Spray bars 42 are mounted over the deck 32 of each dewatering screen 30A,30B for adding fresh water to the material on the deck 32 thereof.

Each dewatering screen 30A,30B will remove the larger solid material, wash it, and discharge it onto a conveyor belt (not shown) having a loading end located beneath the downstream end of the deck 32. The water and smaller solids will fall through the apertures in the deck 32 of the dewatering screen into a collection sump 44 located therebeneath, where the resulting slurry is kept agitated so that it can be pumped to a downstream recycling system. In the embodiment shown in the drawings, a common sump 44 may be provided between the adjacent pair of dewatering screens 30A,30B of the (or each) pair of reception hoppers 10A,10B.

Adjustable plates and bars 46 may be provided in and/or below the opening 20 in the base 12 of each reception hopper 30A,30B to allow a degree of retention of the inflow to slow the feed rate of water onto the deck 32 of the respective dewatering screen 30A,30B. These bars or plates 46 may be adjusted on commissioning to allow the desired flow rate.

The side walls 14,16 and/or the rear wall 18 of each reception hopper 10A,10B may have angled diverter plates 27 welded to them to break up the wave of incoming flow and reduce and contain the splash.

Each reception hopper 10A,10B contains access walkways 28 on either side of the opening 20 in the base 12 of the reception hopper 10A,10B, with guard rails 29 between the walkways 28 and the opening 20 in the base 12 of the respective reception hopper 10A,10B, allowing safe access for an operator. Drain and/or submersible pumps may be provided for collecting and removing rain water or oversplash.

Hose reels 50 may be mounted in each reception hopper 10A,10B to allow operators to wash out the back of a tanker 2 located therein. The walkways 28 also prevent the operator from standing under the raised back door of the hydrovac tanker 2 to protect them from potential crush due to inadvertent closing.

Each reception hopper has a mirror 52 and traffic light system 54. The mirror 52 allows the driver to see the rear of the tanker 2 relative to the hopper and therefore reverse up to the optimum position. The traffic light system 54 may act as a status light so the driver can tell if the respective dewatering screen 30A,30B is operational, in standby or non-operational. The status will take into account the available volume in the sump 44 associated with the respective dewatering screen to ensure that it can accept the full volume of liquid in the tanker without overflowing.

There is a start/stop control on each station for the driver to activate and deactivate the respective dewatering screen so that it is not running constantly. The control system will ensure the slurry pump in the sump associated with the respective screen keeps running until the sump is empty, and that the water flush and spray bars do not overflow the sump. Due to the shallow rear walls of both the hopper and the sump rinse bars may be provided that (while running) continually rinse down the walls to wash solids down and prevent build up.

Figure 9:
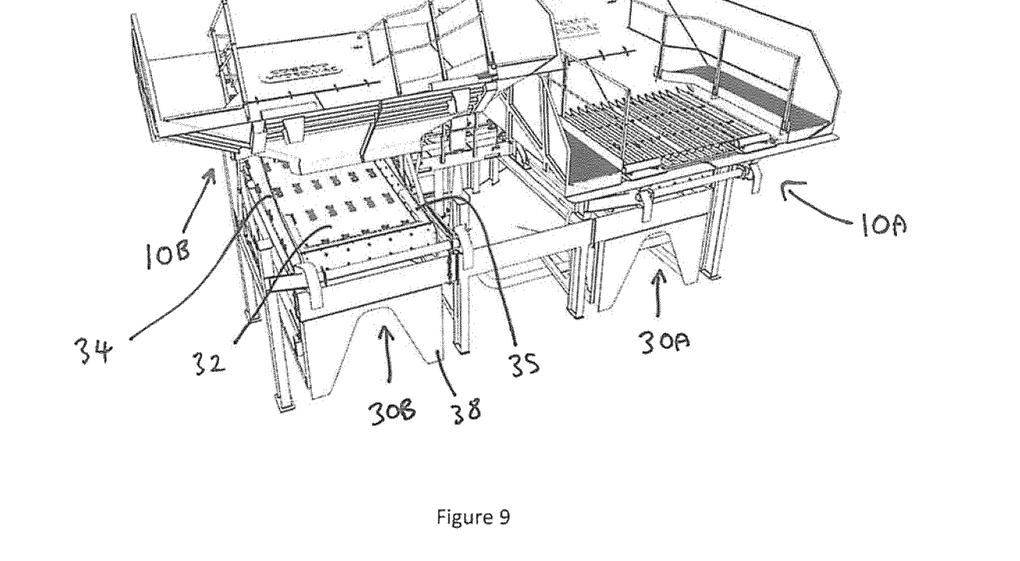
FIGS. 9 and 10 are perspective views of the apparatus of FIG. 1 showing the reception hoppers is raised positions for access to the dewatering screen.
Figure 10:
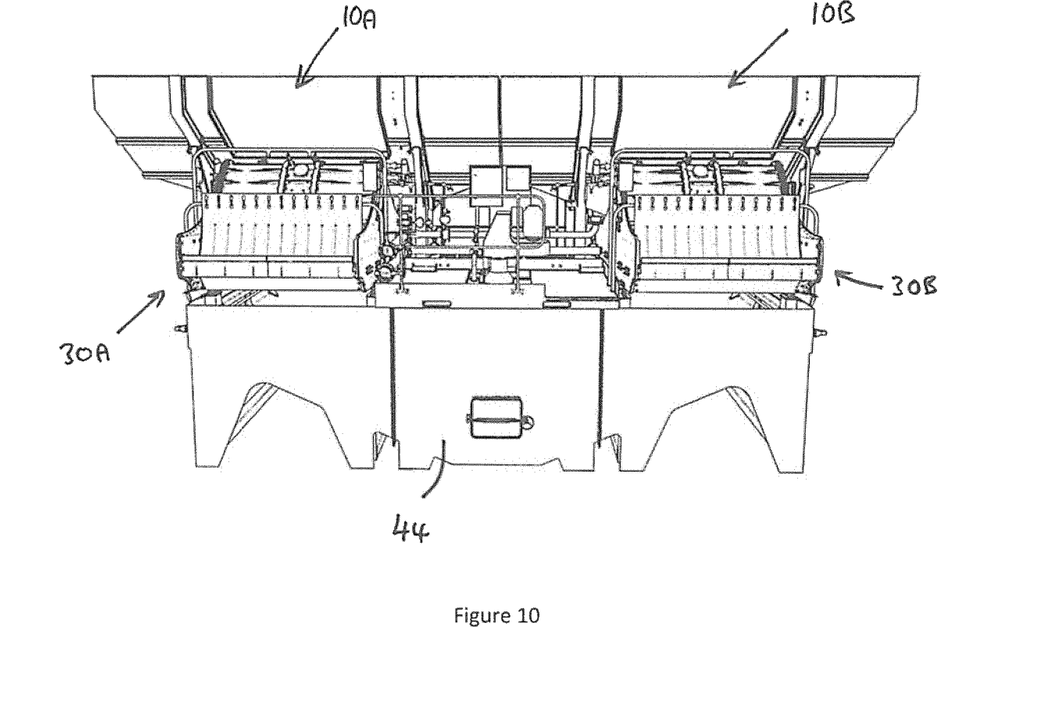
Figure 11:
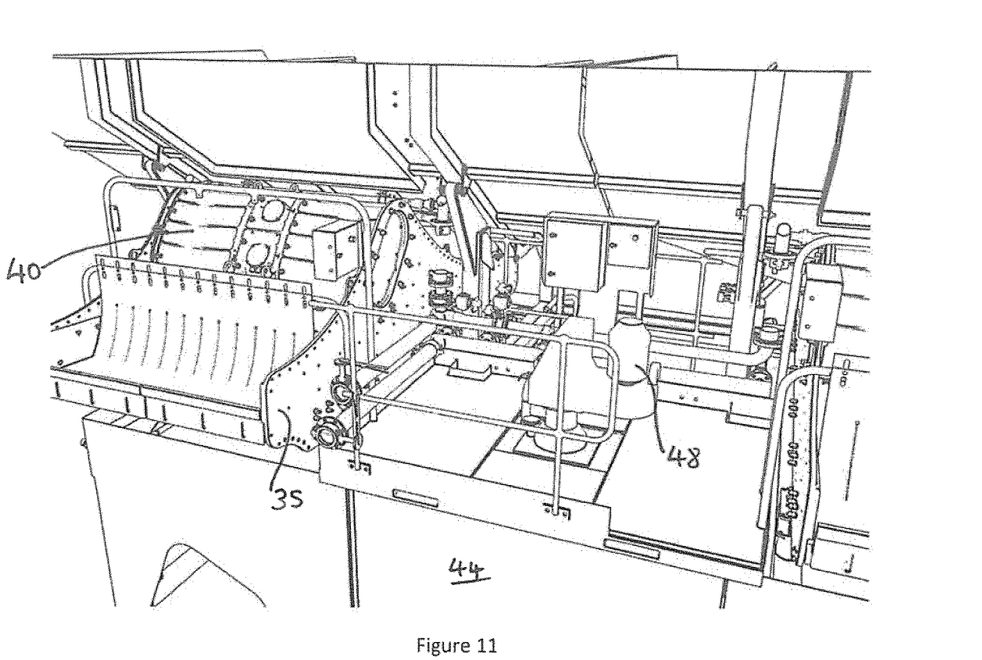
FIGS. 11 and 12 are detailed perspective views of the dewatering screens of the apparatus of FIG. 1.
Figure 12:
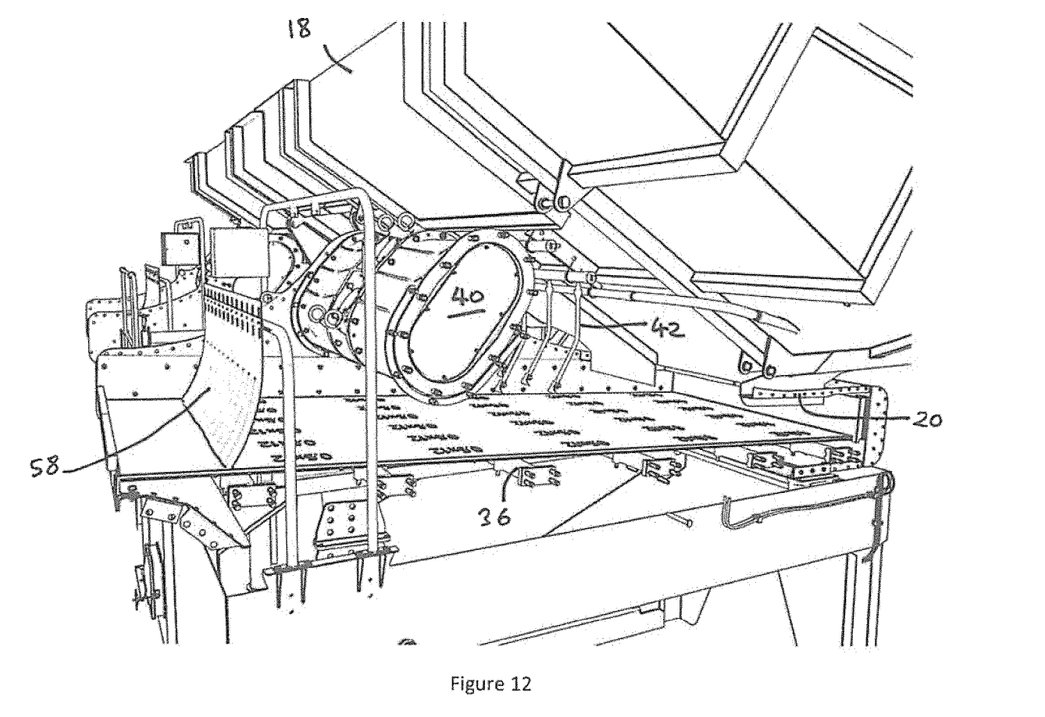

As shown in FIGS. 9 and 10, a hydraulic tipping mechanism may be provided adapted to lift each hopper 10A,10B upwardly and forward to allow maintenance access to the rear of the respective dewatering screen 30A,30B. The rams may have protection systems to prevent the respective hopper falling in the event of a hydraulic failure.

In a twin reception system as shown in the drawings, having two side by side reception hoppers 10A,10B, a shared sump 44 may be provided to collect the liquid from two tankers via the two dewatering screens 30A,30B. The working volume of such common sump 44 may be sufficient to hold two tankers worth of volume, whilst a shared slurry pump 48 may empty it.

A vertical slurry pump 48 may be provided in the sump 44 with an agitator to pump away the slurry, as well as keep the solid suspended. A vertical pump 48 extending down into the slurry, with a motor located at a top end, also means that maintenance access for the pump and drive motor in particular is kept above ground level (i.e. the level of the base 12 of each reception hopper 10A,10B), as opposed to having the pump beneath the reception hopper, outside of the sump or submerged at the bottom of the sump.

Sump level measurement may be provided to ensure that the pump 48 starts when the level rises, and stops when the (or each) sump 44 is empty.

The dewatering screen 30A,30B beneath each reception hopper may be designed to retain the initial influx of water in a number of ways:— a. rubber sealing strips may be provided around 3 sides of opening 20 in the respective hopper 10A,10B to direct flow onto the deck 32 and prevent splash out of the rear of the screen 30A,30B;

b. the side walls of the hopper have a relatively steep incline (approximately 4°) and/or may be adjustable to vary the angle of inclination, in particular in the case of the rear wall;

c. spray bars may be provided on the side walls and/or rear wall of the hopper to hold back and wash material through;

d. one or more rubber curtains may be provided over the deck 32 of each dewatering screen 30A,30B, in particular adjacent the downstream end of the deck 32 thereof, to hold material back further if necessary.

Gates 58 may be provided in front of each reception hopper 10A,10B.

Each reception hopper may be formed from separable parts allowing the apparatus to be broken down and containerised for transportation.

It is envisaged that a slurry handling apparatus in accordance with the present invention may incorporate additional processes for recycling slurry from a hydro-evacuation process, including means for producing one or more further products.

Figure 1:
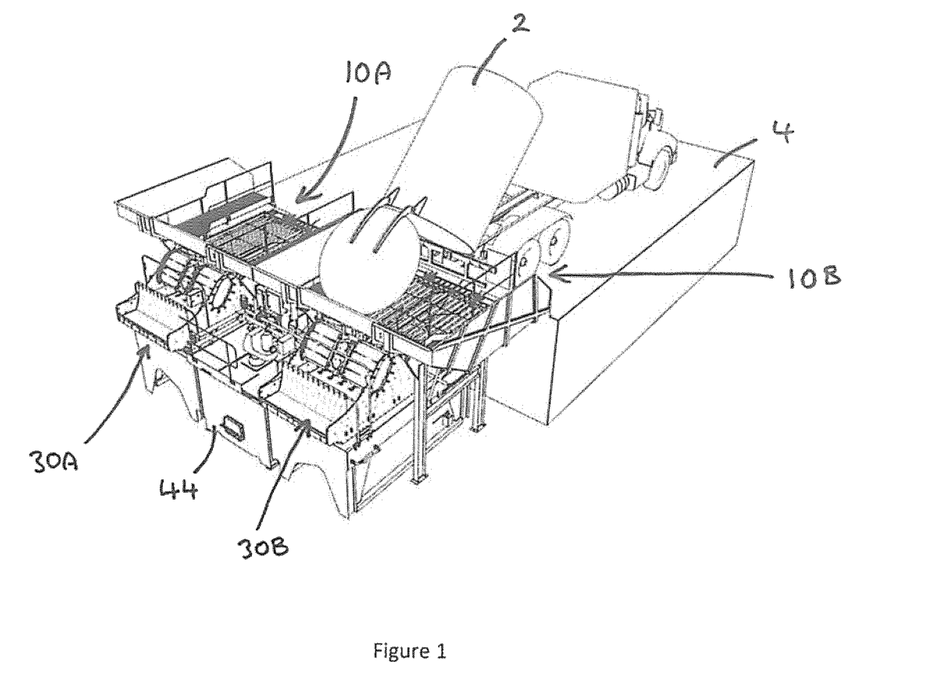
FIG. 1 is a rear perspective view of a slurry handling apparatus in accordance with a first embodiment of the present invention showing a tanker in an unloading configuration.
Figure 2:
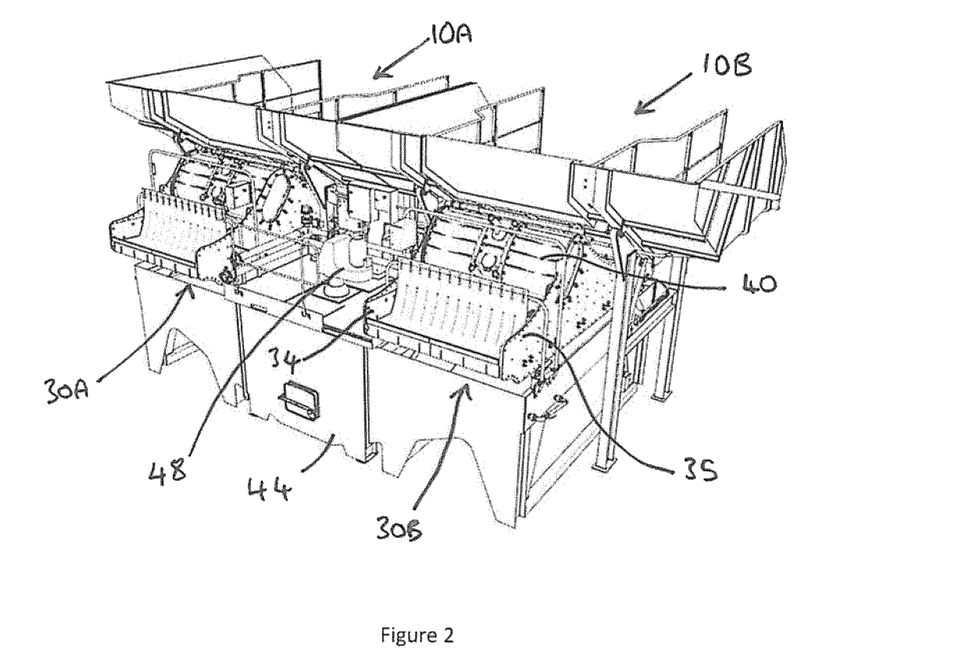
FIG. 2 is a further perspective view of the apparatus of FIG. 1.
Figure 3:
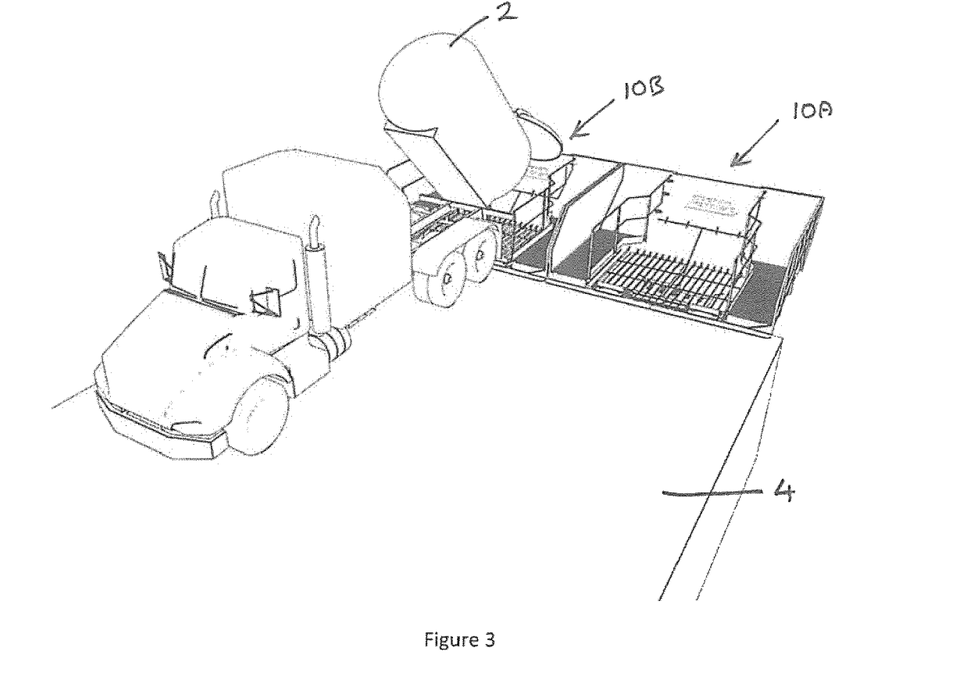
FIG. 3 is a front perspective view of the slurry handling of FIG. 1 showing a tanker in an unloading configuration.
Figure 4:
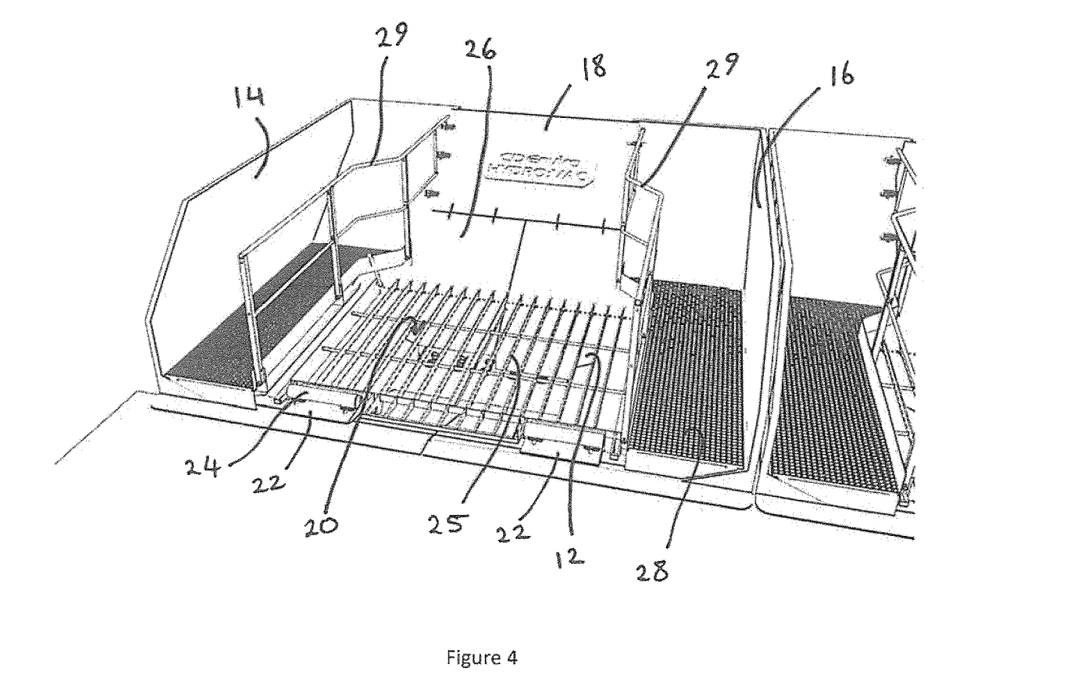
FIG. 4 is a detailed perspective view of one reception station of the apparatus of FIG. 1.
Figure 5:
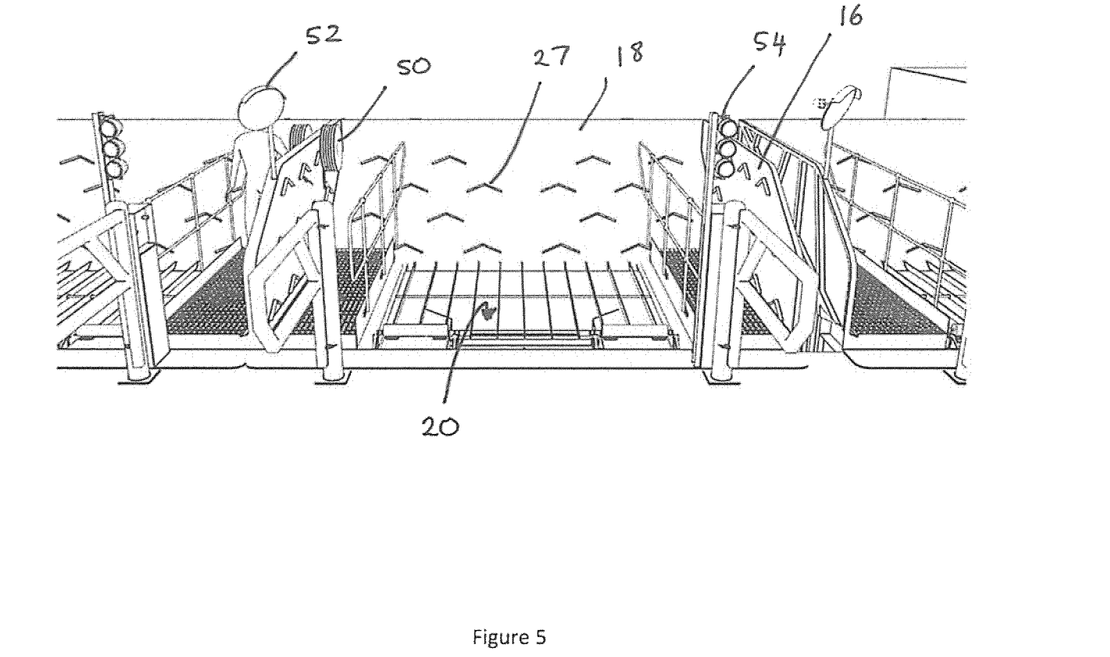
FIG. 5 is a further detailed perspective view of one reception station of the apparatus of FIG. 1.
Figure 6:
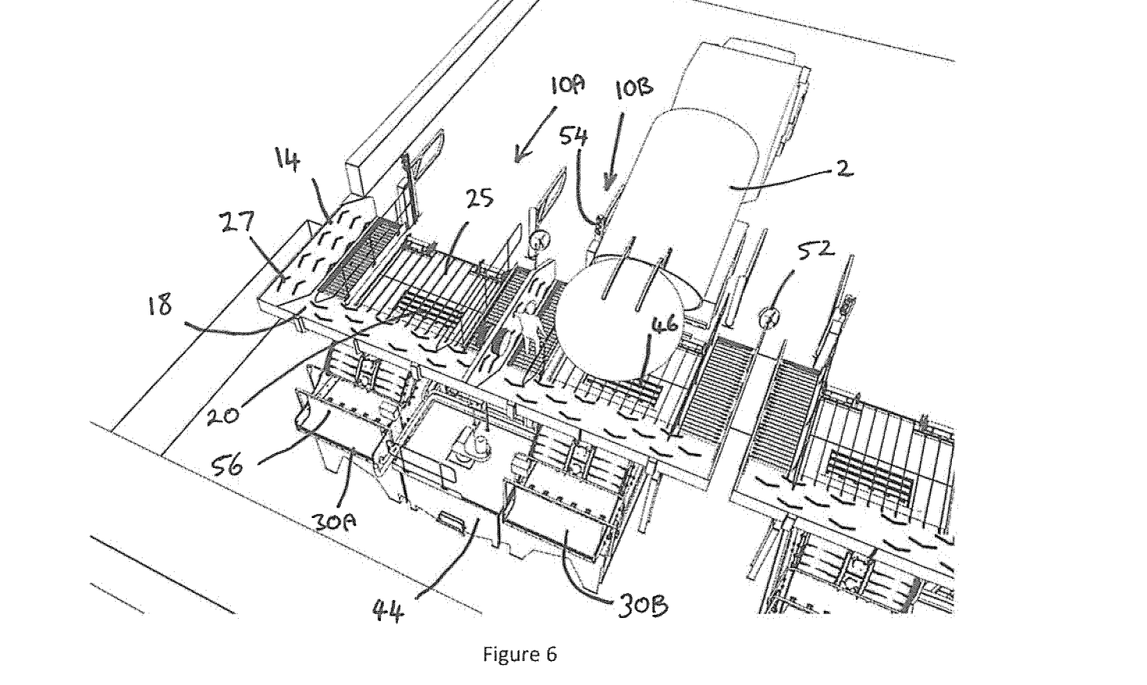
FIG. 6 is a perspective view from above of the slurry handling of FIG. 1 showing a tanker in an unloading configuration.
Figure 7:
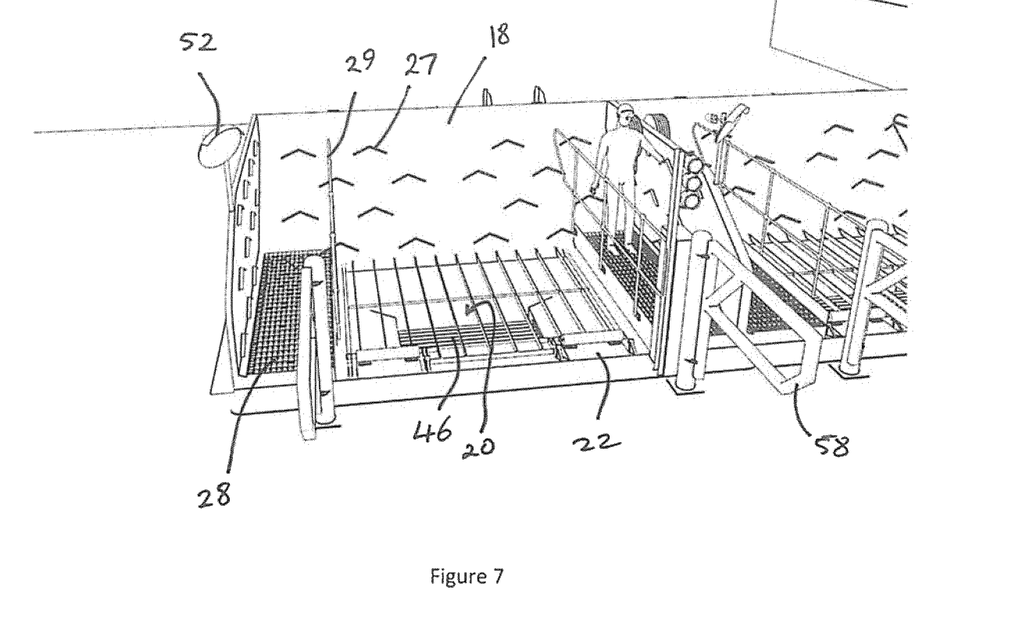
FIGS. 7 and 8 are further detailed perspective views of one reception station of the apparatus of FIG. 1.
Figure 8:
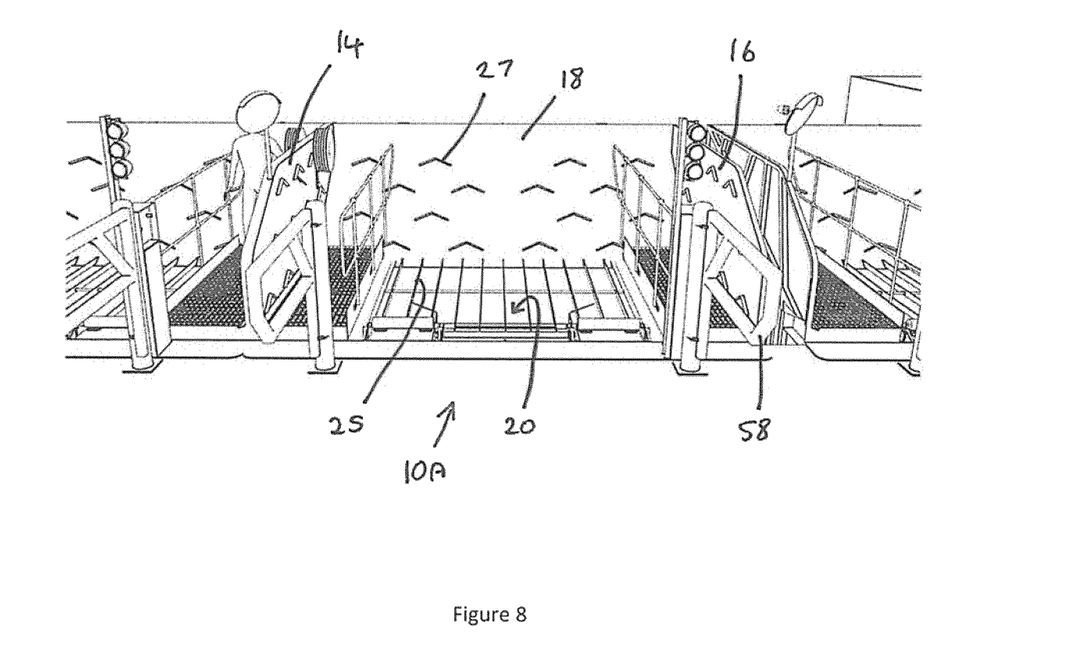
Figure 13:
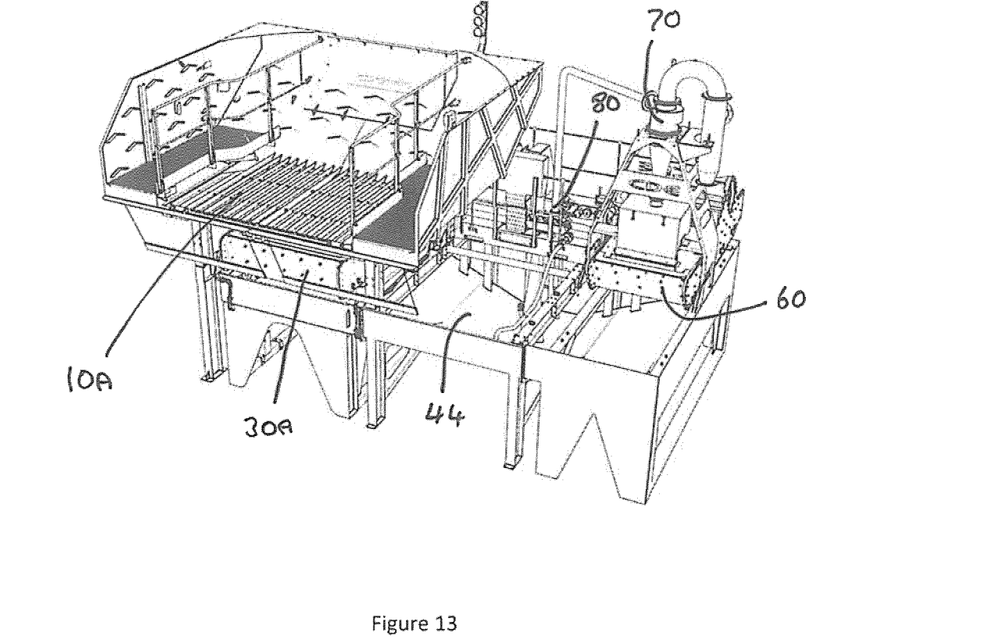
FIGS. 13 and 14 are perspective views of a slurry handling apparatus in accordance with a second embodiment of the present invention.
Figure 14:
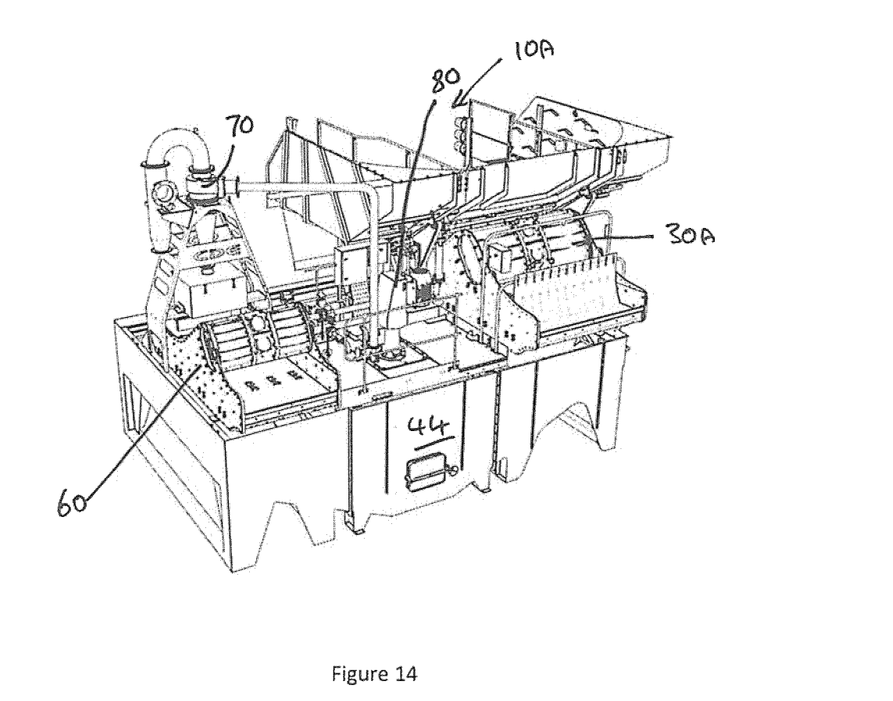

In the embodiment shown in FIGS. 13 and 14, a second dewatering screen 60 having a cyclone 70 mounted thereabove, replaces one of the two reception hoppers of the embodiment of FIG. 1, such that the second dewatering screen 60 and cyclone 70 are mounted alongside the reception hopper 10. A pump 80 is associated with the sump 44 receiving undersize material from the first dewatering screen 30A beneath the reception hopper 10A, the pump 80 transferring the slurry from the sump 44 to an inlet of the cyclone 70 mounted above the second dewatering screen 60. The underflow from the cyclone 70 flows under gravity onto the deck of the second dewatering screen 60 to produce a second grade of product, for example a second grade of sand, from a downstream end of the deck. Undersize material and water from the deck of the second dewatering screen may be delivered to the sump 44.

The overflow from the cyclone 70, containing water and fine silt/contaminants may be passed to further water treatment process, such as a settlement tank, to allow the water to be reused. A portion of the overflow from the cyclone 70 may be passed back to the sump 44 to control the water level in the sump 44, preferably by means of a level sensor in the sump 44 and a flow control valve in a delivery pipe between the overflow of the cyclone 70 and the sump 44. This may ensure that the inlet of the pump 80 remains submerged.

This arrangement provides a compact single machine that can accommodate the surge volume of direct tank discharge and can screen/grade and dewater two products from the waste slurry, and send any remaining liquid for de-silting and reuse.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A slurry handling apparatus comprising:
    at least one reception hopper adapted to receive slurry from a hydrovac tanker, said reception hopper comprising:
        a base defining an opening, wherein slurry delivered into said reception hopper from the hydrovac tanker can pass through said opening; and
        a rear wall and opposing side walls;
    a respective first dewatering screen having an apertured screening deck being located beneath said at least one reception hopper and configured so that slurry passing through said opening is delivered onto said deck of said respective first screen, undersize material and water passing through said apertures of said deck to be received within a sump, and oversize material passing over said deck to be discharged from a downstream end of said deck; and
    flow control members in the form of inverted V shaped plates mounted on and extending from said rear wall and/or said side walls, said flow control members adapted to arrest the flow of water up said walls when slurry is initially discharged into said reception hopper.

2. The slurry handling apparatus as claimed in claim 1, wherein spray bars are located over said deck of said respective first dewatering screen for washing material on said deck of said screen.

3. The slurry handling apparatus as claimed in claim 1, wherein said base of said at least one reception hopper is at the same height as an adjacent roadway whereby the hydrovac tanker may reverse up the roadway to said reception hopper and discharge slurry from a storage tank thereof into said at least one reception hopper.

4. The slurry handling apparatus as claimed in claim 3, wherein a front portion of said base of said at least one reception hopper is configured to receive rear wheels of the hydrovac tanker.

5. The slurry handling apparatus as claimed in claim 4, wherein raised backstops are provided for limiting the travel of the hydrovac tanker over said base of said at least one reception hopper.

6. The slurry handling apparatus as claimed in claim 1, wherein walkways are provided on either side of said opening in said base of said at least one reception hopper.

7. The slurry handling apparatus a claimed in claim 6, wherein barriers are provided between said walkways and said opening in said base of said at least one reception hopper.

8. The slurry handling apparatus as claimed in claim 1, wherein a grill or grid is located over said opening in said base of said at least one reception hopper to prevent persons from falling into said opening.

9. The slurry handling apparatus as claimed claim 1, wherein flow control members are provided on said rear wall and/or said side walls of said at least one reception hopper for arresting the flow of water up said wall or walls when slurry is initially discharged into said reception hopper.

10. The slurry handling apparatus as claimed in claim 9, wherein said flow control members comprise inverted V shaped plates that are mounted on and extend from said rear wall and/or said side walls of said at least one reception hopper.

11. The slurry handling apparatus as claimed in claim 1, wherein a pump is provided for pumping slurry collected in said sump to one or more further processes.

12. The slurry handling apparatus as claimed in claim 11, wherein said pump is adapted to agitate the slurry held within said sump.

13. The slurry handling apparatus as claimed in claim 11, wherein at least one of said one or more further processes is incorporated into said slurry handling apparatus.

14. The slurry handling apparatus as claimed in claim 13, wherein a second dewatering screen and a cyclone are mounted adjacent said at least one reception hopper, said pump delivering slurry from said sump to an inlet of said cyclone, an underflow from said cyclone being delivered onto a deck of said second dewatering screen, oversize material from said deck of said second dewatering screen comprising a second product.

15. The slurry handling apparatus as claimed in claim 14, wherein the overflow from said cyclone is passed for further processing to allow the water to be reused.

16. The slurry handling apparatus as claimed in claim 14, wherein a portion of the overflow from said cyclone is passed to said sump of said respective first dewatering screen to maintain the water level therein.

17. The slurry handling apparatus as claimed in claim 14, wherein said cyclone is mounted above said second dewatering screen and said second dewatering screen is mounted alongside said respective first dewatering screen.

18. The slurry handling apparatus as claimed in claim 14, wherein undersize material and water from said deck of said second dewatering screen is delivered to said sump of said respective first dewatering screen.

19. The slurry handling apparatus as claimed in claim 1, wherein an access door is provided in said base and/or said rear wall of said at least one reception hopper openable to provide access to said respective first dewatering screen.

20. The slurry handling apparatus as claimed claim 1, wherein an indicator is provided on said at least one reception hopper for indicating to a driver of the hydrovac tanker a status of said respective first dewatering screen.

21. The slurry handling apparatus as claimed in claim 20, wherein said indicator comprises one or more lights.

22. The slurry handling apparatus as claimed in claim 1 comprising a plurality of reception hoppers mounted in side by side relationship.

23. The slurry handling apparatus a claimed in claim 22, wherein said respective first dewatering screen comprises a plurality of first dewatering screens mounted beneath respective ones of said reception hoppers.

24. The slurry handling apparatus as claimed in claim 1, wherein said apertures in said deck of said respective first dewatering screen are approximately 6 mm wide.

25. The slurry handling apparatus as claimed in claim 1, wherein said opening in said base of said at least one reception hopper is provided with a flow controller to limit the flow rate of water and/or slurry delivered through said opening onto said deck of said respective first dewatering screen.

26. The slurry handling apparatus as claimed in claim 25, wherein said flow controller comprises bars or plates located in and/or beneath said opening.

27. The slurry handling apparatus as claimed in claim 1, wherein said at least one reception hopper may be adapted to be raised to provide maintenance access to said respective first dewatering screen therebeneath.

\* \* \* \* \*